(12) United States Patent
Jacobs

(10) Patent No.: US 12,726,152 B2
(45) Date of Patent: Sep. 1, 2026

(54) SOLAR PANEL RAIL

(71) Applicant: KLOECKNER METALS CORPORATION, Roswell, GA (US)

(72) Inventor: Jeremy Jacobs, Sacramento, CA (US)

(73) Assignee: Sol Components LLC, Wilmington, DE (US)

( * ) Notice: Subject to any disclaimer, the term of this patent is extended or adjusted under 35 U.S.C. 154(b) by 78 days.

(21) Appl. No.: 18/738,453

(22) Filed: Jun. 10, 2024

(65) Prior Publication Data

US 2024/0333208 A1 Oct. 3, 2024

Related U.S. Application Data

(63) Continuation of application No. 17/829,320, filed on May 31, 2022, now Pat. No. 12,009,777.

(60) Provisional application No. 63/169,640, filed on Apr. 1, 2021.

(51) Int. Cl.
*H02S 20/32* (2014.01)
*H02S 30/10* (2014.01)

(52) U.S. Cl.
CPC .............. *H02S 20/32* (2014.12); *H02S 30/10* (2014.12)

(58) Field of Classification Search
None
See application file for complete search history.

(56) References Cited

U.S. PATENT DOCUMENTS

2013/0037087 A1* 2/2013 Janssens ............... F24S 25/636 136/251

* cited by examiner

*Primary Examiner* — Jayne L Mershon
(74) *Attorney, Agent, or Firm* — Fitzpatrick PC

(57) ABSTRACT

A solar panel rail for mounting a photovoltaic module frame thereto is provided and has a rail body configured to for attachment of a rail bracket, an indexing flange located on the rail body and configured to box and maintain a module frame position along a short-side direction of the module frame, a tab located on the rail body and configured to hold the module in place along a long-side direction of the module frame, wherein the indexing flange and tab are configured to provide a predetermined locked in installation position of the module frame during installation thereof.

17 Claims, 11 Drawing Sheets

SOLAR PANEL RAIL

CROSS-REFERENCE TO RELATED APPLICATIONS

This application is a continuation of U.S. patent application Ser. No. 17/829,320, filed May 31, 2022, issuing as U.S. Pat. No. 12,009,777 on Jun. 11, 2024, which claims the benefit of U.S. Provisional Patent Application Ser. No. 63/169,640, filed Apr. 1, 2021, the entire contents of both are incorporated by reference herein for all purposes.

FIELD OF THE INVENTION

The present invention generally relates to solar mounting systems. More specifically, the present invention relates to a solar panel rail design with integrated indexing flanges and tabs.

BACKGROUND

Renewable energy sources are increasingly being seen as the solution to meeting growing energy demands while reducing greenhouse gas emissions and dependence on fossil fuels. Solar energy is a viable solution to meeting the ever-increasing demand for energy. The use of solar cells or photovoltaic cells is one method of harnessing the sun's energy. The solar cell is a device that converts light energy into electrical energy by the photovoltaic effect.

In solar energy systems, while efficiency is an important aspect of the useful energy output of the system, the major factor affecting solar energy generation is one of adoption due to high costs of installation. Whether the solar energy system is in the form of a fixed ground mount, tilt, large commercial solar arrays, rooftop, or parking canopy, installation costs are a major factor whether or not customers adopt solar energy.

Large commercial solar mounting systems contain hundreds or thousands of solar panels at a single installation site, to increase adoption, thereby decreasing the costs by simplifying the installation process, the amount of parts required, and the amount of labor required. During installation, each separate installation step must be performed to connect and mount a solar panel onto the support structure, and these steps must be repeated hundreds or thousands of times. This means a significant amount of additional hours of labor needed during the installation process as well as a significant number of required parts. In particular, in building out these large solar racks, a very large number of screws or other types of fasteners are needed to ensure the assembly has the structural integrity required when being used. Further, in building these out, the required joining of these pieces together is a difficult process for the installer and therefore increases the labor costs and demands.

As an example, current assemblies are mounted to a torque tube via a bracket mounted on the bottom of the tube with two long bolts and two nuts. The installer must either preassemble and slide the assembly along the entire length of the tube, which is very tedious, or assemble one bolt at a time and then secure two bolted connections from the top down, which takes an exorbitated amount of time and labor.

In light of the above-mentioned problems, there is a need for a solar racking rail which is both easy to install and obviates the need for the conventional amount of fasteners while still keeping its structural integrity.

SUMMARY OF THE INVENTION

The present disclosure is direct toward a solar mounting rail for the attachment of solar modules. More specifically, the disclosure provides a solar mounting rail having tabs and indexing flanges, which index and hold the solar modules in place in both north/south (N/S) and east/west (E/W) directions.

The mounting rail described herein comprises preassembled brackets configured to unfold and secure to the tube via a single carriage bolt across the bottom of the tube. In this way, carriage bolts can be installed faster than the standard assemblies. Furthermore, the brackets also provide squaring for the panel rail without the need for separate squaring operation with a carpenter's square or straight edge.

Furthermore, the mounting rail described herein comprises flanges/indexing tabs so that the modules are slid into place automatically (e.g., the rails are spaced and configured in a manner that ensures there is no way to install the modules incorrectly).

In one embodiment, the mounting rail comprises at least one tab configured to index and hold the modules in place in both the N/S and E/W directions, the tabs being integrated into the rail profile. In operation, the tabs generally obviate the requirement for separate clips, pieces, and hardware needed for the indexing features to operate. This results in a simpler, more reliable, and cost-effective mounting system. In embodiments, the tab indexing feature supports both fastener-free module clips and direct bolt connections. With use of this feature, the hardware can be more rapidly installed by hanging the modules exactly in place.

In embodiments a solar panel rail for mounting a photovoltaic module frame thereto is provided and comprises a rail body configured to for attachment of a rail bracket; an indexing flange located on the rail body and configured to box and maintain a module frame position along a short-side direction of the module frame; a tab located on the rail body and configured to hold the module in place along a long-side direction of the module frame; wherein the indexing flange and tab are configured to provide a predetermined locked in installation position of the module frame during installation thereof.

In an embodiment a method for mounting a photovoltaic module frame to a solar panel rail is provided. The method comprises unfolding the panel rail brackets such that the brackets are free to spin; securing the panel rail to a torque tube via single carriage bolts; installing the module to the panel rail by hanging the module frame modules on a panel rail tab; indexing the module frame via indexing flanges that are configured to box in the module frame along the direction of the torque tube such that the tabs hold the module frame in a perpendicular direction; and fastening the modules to the solar panel rail via a direct bolt or a cinch clip.

In embodiments, the mounting rail comprises a bracket configured to secure the panel rail to torque tubes using vibration-resisting hardware thereby supporting the solar cells. The bracket is configured to fasten the panel rail assembly to a torque tube (or other shapes) using a single bolt. In this way, the bracket obviates the need for two fasteners and a "fiddly" bracket that must be assembled on site thereby lessening the amount of hardware required for the mounting system.

In operation, the mounting rail may be a hat roll-formed high-strength light gauge sheet steel, but it may also be any other useful shape. In operation, it supports both traditional modules and bifacial modules, thereby allowing for power generation on the backside of the panel.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION OF THE INVENTION

Figure 1:
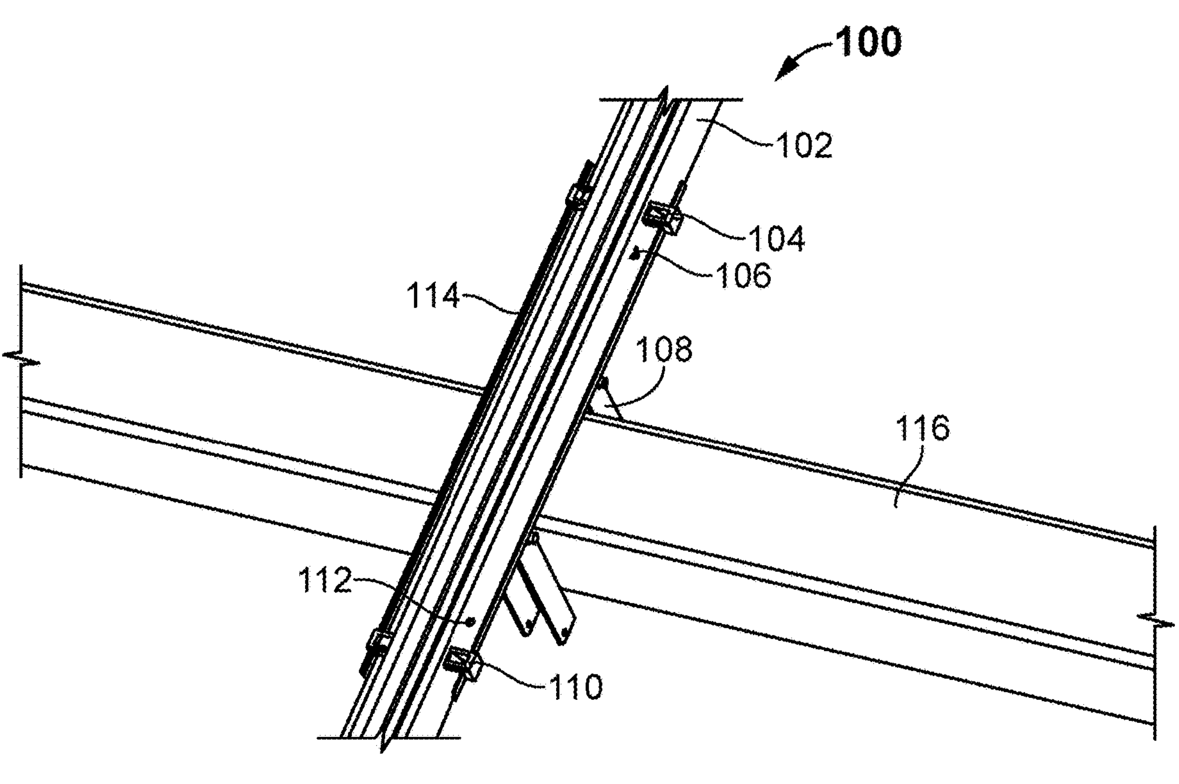
FIG. 1 shows a top perspective view of solar mounting rail coupled to a torque tube in embodiments of the present invention.

The present invention is best understood by reference to the detailed figures and description set forth herein.

It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

Embodiments of the system are discussed below with reference to the examples. However, those skilled in the art will readily appreciate that the detailed description given herein with respect to these examples is for explanatory purposes as the system extends beyond these limited embodiments. For example, it should be appreciated that those skilled in the art will, in light of the teachings of the present system, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the system that are too numerous to be listed but that all fit within the scope of the system. Also, singular words should be read as plural and vice versa and masculine as feminine and vice versa, where appropriate, and alternative embodiments do not necessarily imply that the two are mutually exclusive.

It is to be further understood that the present system is not limited to the particular methodology, compounds, materials, manufacturing techniques, uses, and applications, described herein, as these may vary. It is also to be understood that the terminology used herein is used for the purpose of describing particular embodiments only and is not intended to limit the scope of the present system. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this system belongs. Preferred methods, techniques, devices, and materials are described, although any methods, techniques, devices, or materials similar or equivalent to those described herein may be used in the practice or testing of the present system.

Referring to FIG. 1, a top perspective view of solar rail 100 coupled to a torque tube 116 in embodiments of the present invention is shown generally. As can be seen herein, the rail 100 comprises a rail body attached to module frame 102, and comprises cinch clip 104, tab 106, bracket 108, second cinch clip 110, module frame mounting hole 112. In operation, the solar rail is configured to attach to the torque tube 116 and support photovoltaic cells thereon using the indexing flange 114, tab 106 and panel rail bracket 108. The indexing flange 114 is configured to box and maintain the module frame position along the short side direction of the module. By short side direction it is meant as north south for tracker assemblies and east west for fixed tilt assemblies. A tab 106 is positioned proximate the indexing flange 114 and is configured to work with the indexing flange 114 to hold the module in place along the long side direction of the module meaning east west for tracker assemblies and north south for fixed tilt assemblies. In combination with the indexing flange 114 the module is placed or hung in the correct installation position by the user or operator with relative ease.

A panel rail bracket 108 is connected to the mounting rail 100 on a bottom portion of the mountain rail adjacent thereto. The panel rail bracket 108 is configured as the mounting component between the panel rail and the torque tube 116. This panel rail bracket 108 may be pre-assembled at the factory and nested for shipping.

With reference still to FIG. 1, a cinch clip (e.g., ARaymond® cinch clip) is coupled to the mounting rail 100 downstream of the indexing flange 114 and the tabs 106. The first 104 and second cinch clip 110 is configured for rapid assembly of the module to the rack. These cinch clips 110 obviate the need for direct bolting to the module which slows the fabrication process down. However, in other embodiments a direct bolt may be used.

The mounting rail may also comprise module frame mounting holes 112 in other embodiments. A side rail extending from the rail to act as an attachment point for other elements may be provided as well.

In operation, the installer may hang the modules on the panel rail tabs 106. The indexing flange 114 is configured to box in the frame along the direction of the tube and the tabs are configured to hold the frame in the perpendicular direction. The modules can then be fastened to the rail assembly 100 via direct bolt (for which the holes needed will now be aligned automatically) or a free cinch clip 110.

Figure 2:
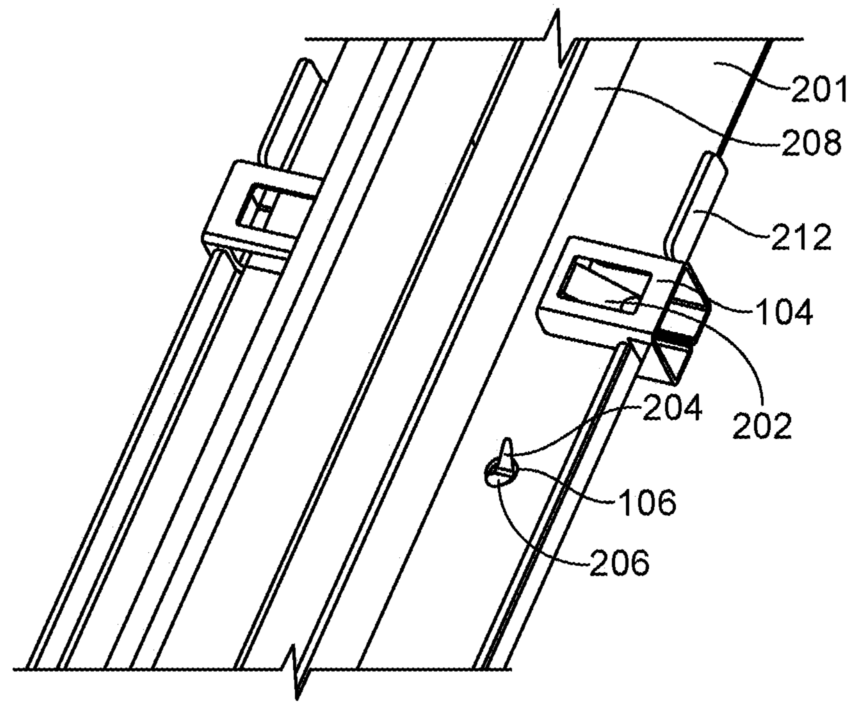
FIG. 2 shows a top perspective view of the mounting rail in embodiments of the present invention.

Referring now to FIG. 2, a top perspective view of the mounting rail 100 magnifying the cinch clip 104 and tab 106 and coupled to a photovoltaic cell frame 201 is shown. As can be seen here in the cinch clip 104 comprises a locking tab 202 configured to secure the module in place using the module frame mounting hole and to further provide additional clamping force. The cinch clip 110 is located next to the tab 106 which abuts the cinch clip 110. In this way, the tab 106 forms a designated cut out space dimensioned to fit and anchor the cinch clip 110 so that it attaches to the module frame 102. Downstream of the clip 110, tab 106 comprises flanges 204 and 206. The flanges 204 and 206 are configured to hold the modules in place using module frame mounting hole 112. The body has a module frame 208 which is part of the module construction.

Figure 3:
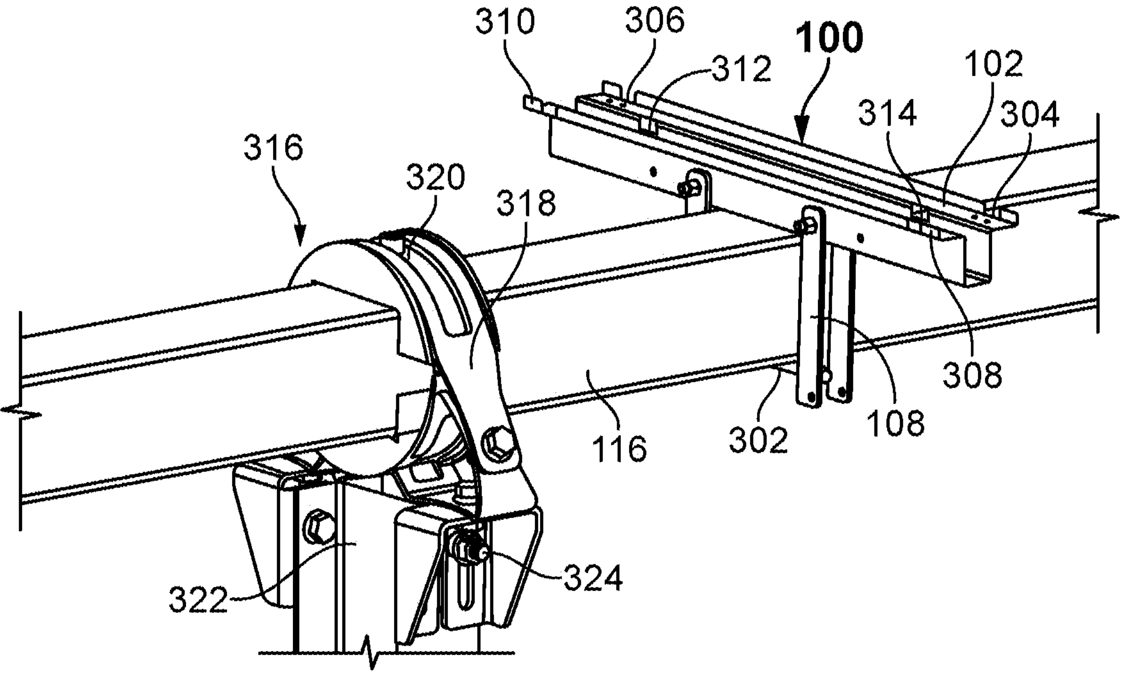
FIG. 3 shows a side perspective view of a mounting rail attached to a torque tube in accordance with an embodiment of the present invention.

Referring now to FIG. 3 shows a side perspective view of a mounting rail attached to a torque tube further showing the bearing assembly 316 and cut outs 306 and 310. As can be seen, the rail 100 is coupled to the torque tube upstream the bearing assembly 316 using a carriage bolt 302 on a bottom portion of the torque tube. Cut outs 304, 306, 308 and 310 are provided for locating the cinch clip or wedge clamp therein. The bearing assembly 316 is configured to support the torque tube 116 and allow for rotation of torque tube 116 for tracking assemblies so that the modules can follow the sun. The bearing assembly comprises bearing assembly cap 318, hard stop track 320, pile foundation 322 and riser 324. In operation, the bearing assembly cap 318 wraps the torque tube and bearing to provide a connection portion to the pile 322, and is used as a tie down for uplift loads. Hard stop track 320 is disposed on the bearing cap assembly and is configured to, at full tilt/tracker safe position, ensure the bearing stops at end of track via internal pins. A riser 324 is coupled to the bearing 316 and is provided to for installation tolerance.

Figure 4:
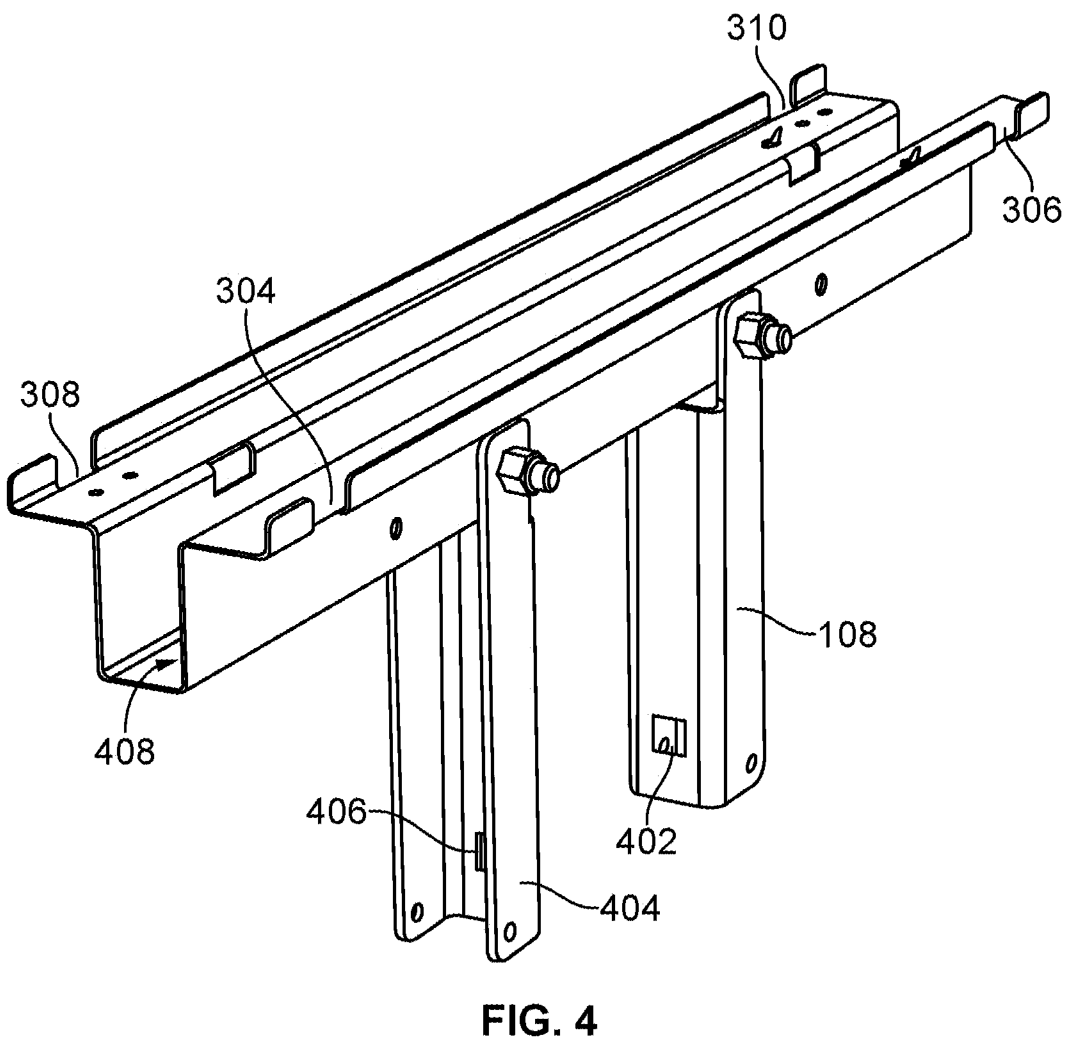
FIG. 4. shows another side perspective view of a mounting rail showing the brackets in accordance with an embodiment of the present invention.

Referring now to FIG. 4, a top-side perspective view of the rail is shown. In this view, the cut-outs 304, 306, 308 and 310 and panel rail brackets 108 can be seen together with a first hole 402 configured to accept a carriage bolt a downstream rail bracket 404, a second hole 406 configured to accept a carriage bolt and an internal bottom portion (i.e., hat) of the rail 100.

Figure 5:
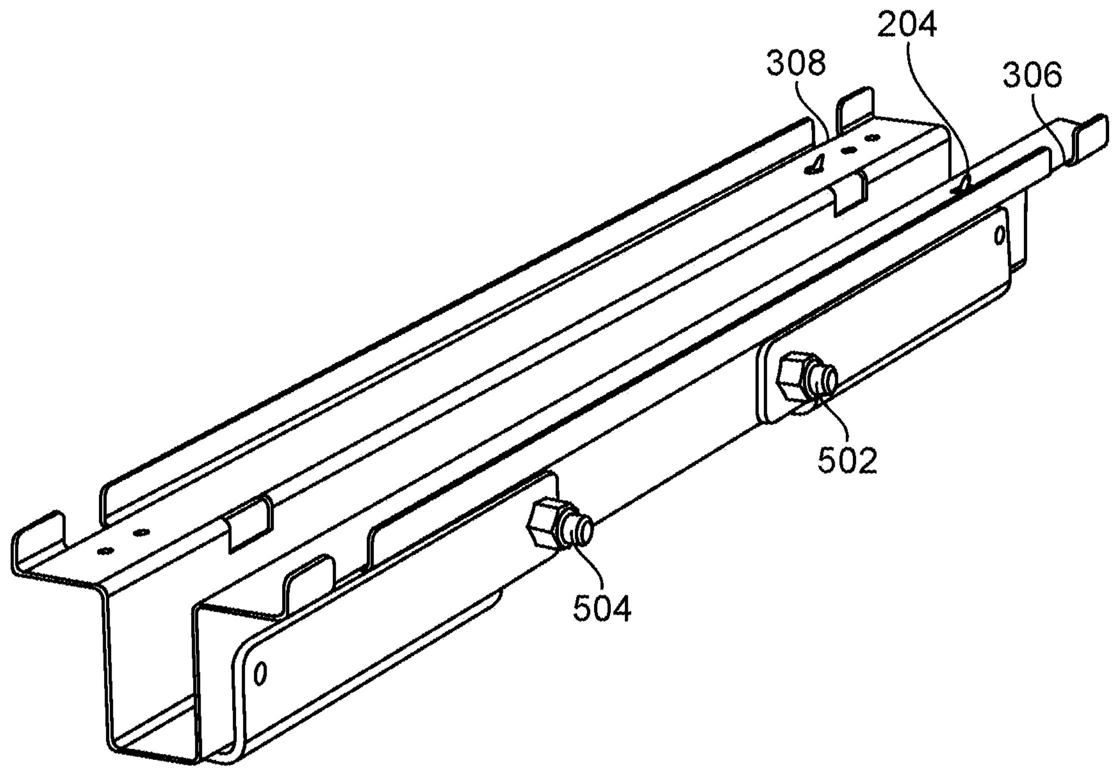
FIG. 5 shows another perspective view of the panel rail with panel rail brackets in a nested position in accordance with an embodiment of the present invention.

FIG. 5 shows another perspective view of the panel rail showing locknut fastener assemblies 502 and 504. The lockout fasteners 502 and 504 are configured to fasten panel rail brackets to panel rail to ensure durability and to further attach other components to the rail and construct the mounting assembly.

Figure 6:
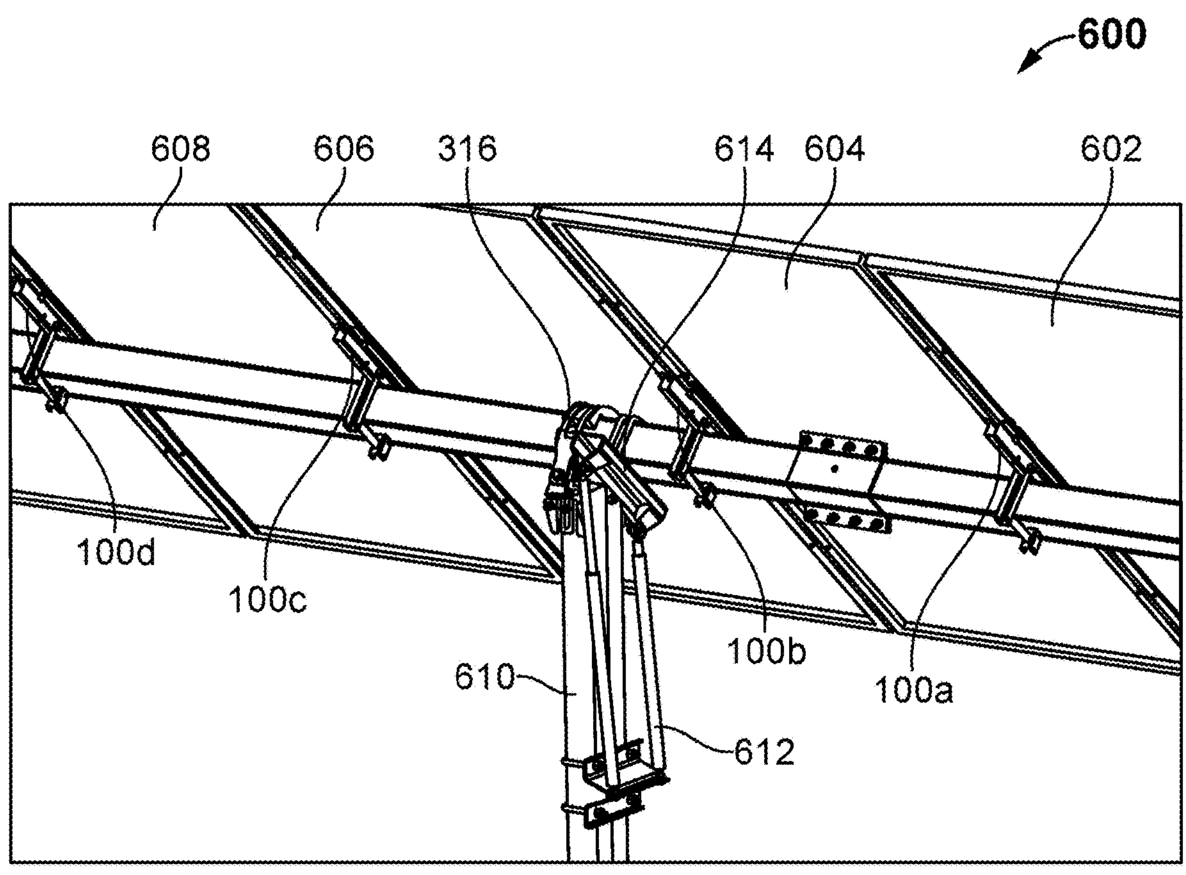
FIG. 6 shows a back view of the solar panel rail in a tracker assembly with solar panels mounted there too in accordance with an embodiment of the present invention.

With reference now to FIG. 6, a back view of the solar panel rail with solar panels mounted thereto is shown generally at 600. Each of the solar panels 602, 604, 606 and 608. As can be seen, each of the rails 100*a*-100*d* are configured to couple the rail to the solar panels. For purposes of configuration, damper 612 is shown. The damper 612 is configured to dampen the modal response of solar tracker assembly and increase the stability of the system. The damper 612 comprises a damper arm to connect the damper to the torque tube.

Figure 7:
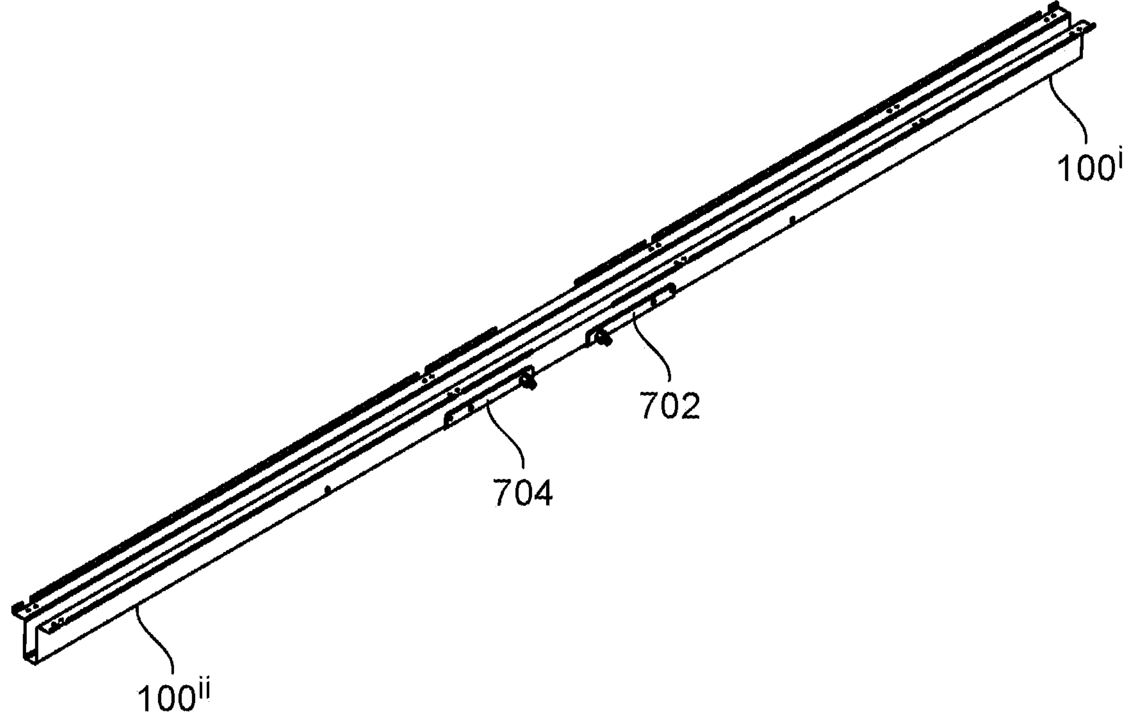
FIG. 7 shows a top perspective view of panel rails mounting two modules in portrait orientation in accordance with embodiments of the present invention.

With reference now to FIG. 7, a top perspective view of panel rails attached together is shown. This configuration shows multiple rails 100$^{i}$ and 100$^{ii}$ connected together using panel rail bracket 702 and 704. In this way, full systems of any size can be built out and constructed.

Figure 8:
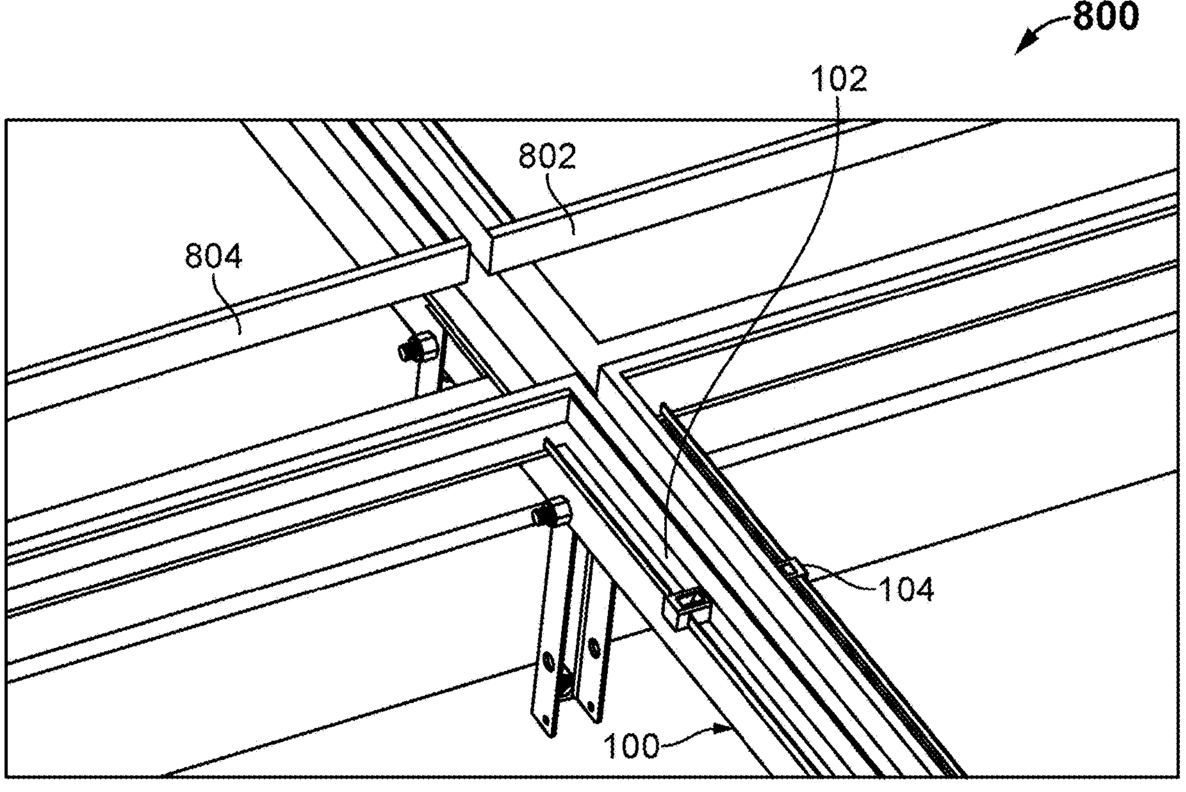
FIG. 8 is a top perspective view of a two-portrait panel rail assembly on the torque tube with module frames engaged with the indexing feature and cinch clip in accordance with embodiments of the present invention.

Referring now to FIG. 8, a top perspective view of a solar panel frame is shown generally at 800. As can be seen, the solar panel frames 802 and 804 are mounted to the mounting rail 100 after indexing.

Figure 9:
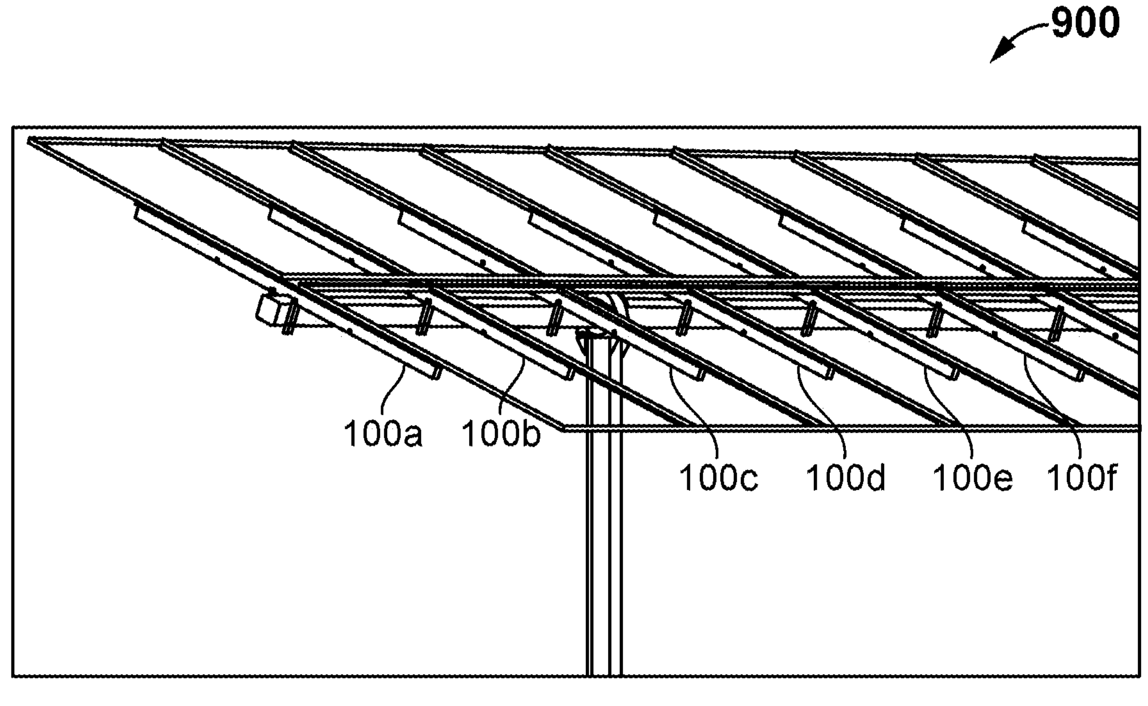
FIG. 9 shows a panel rail on a two-portrait tracker in accordance with embodiment of the present invention.

FIG. 9 shows a front perspective view of a two-portrait tracker utilizing the rail 100*a*-100*f*.

Figure 10:
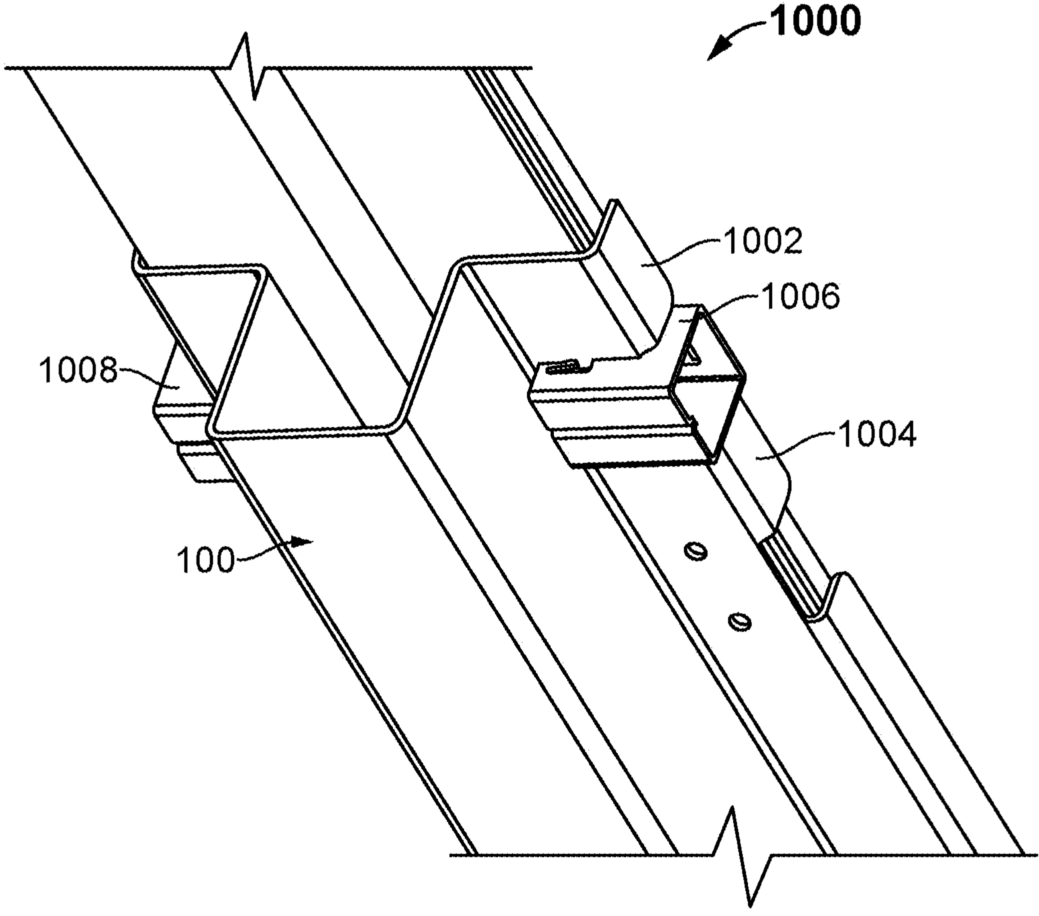
FIG. 10 shows a back view of the panel rail together with the rail indexing flange in accordance with embodiments of the present invention.

FIG. 10 shows a back view of the panel rail together with the rail indexing flange is shown generally at 1000. The solar panels 600 are coupled to the rails 100 using panel rail cinch clip 104 (outer portion 1002, 1004) and cinch clip 110 (outer portion 1006, 1008) can be seen.

As shown the rail 100 is a hat roll-formed high-strength light gauge sheet steel construction. The tab holds the module in position for a clip (e.g., ARaymond® cinch) or bolt-hole alignment. In this way, a single bolt is provided for attachment to the rail. By hanging the module exactly in place with the tab, the hardware can be installed more rapidly. In this way, there are no separate clips, pieces, or hardware needed for the indexing feature to operate.

Figure 11:
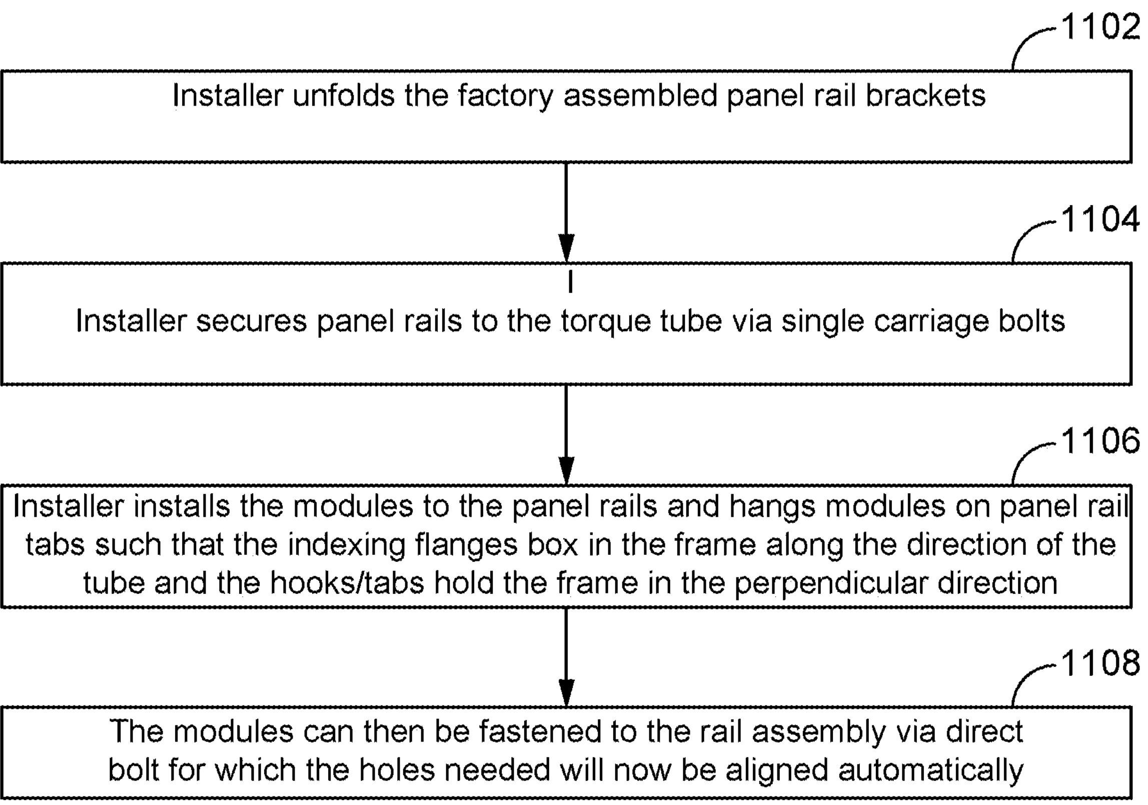
FIG. 11 shows a stepwise method diagram for installing the panel rail in accordance with embodiments of the present invention.

Referring now to FIG. 11, a stepwise method diagram or flow chart showing the installation process with the panel rail is shown. At step 1102, the installer unfolds the factory assembled panel rail brackets such that the brackets are free to spin and do not require any tools. At step 1104, the installer secures panel rails to the torque tube via single carriage bolts. The panel rails should be spaced along the length of the tube per the construction drawings. This spacing ensures the project-specific module is "boxed in" and installed in the exact position. At step 1106, the installer installs the modules to the panel rails and hangs modules on panel rail tabs. The indexing flanges box in the frame along the direction of the tube and the hooks/tabs hold the frame in the perpendicular direction. At step 1108, the modules can then be fastened to the rail assembly via direct bolt (for which the holes needed will now be aligned automatically) or cinch clip.

In embodiments, brackets nest cleanly with the panel rail profile, simplify nesting for shipping and handling, and allow for the panel rail assembly to fasten to the torque tube via a single bolt. The panel rail supports both traditional modules and bifacial modules (that allow for power generation on the backside of the glass).

Preferred embodiments of this invention are described herein, including the best mode known to the inventors for carrying out the invention. It should be understood that the illustrated embodiments are exemplary only and should not be taken as limiting the scope of the invention.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings in the foregoing descriptions. Although specific terms may be employed herein, they are used only in generic and descriptive sense and not for purposes of limitation. Accordingly, the present invention is not limited to the specific embodiments illustrated herein.

The invention claimed is:

1. A solar panel rail for mounting a photovoltaic module frame thereto, the solar panel rail comprising:

a rail body;

an indexing flange comprising a protrusion extending outwardly from the rail body and one or more cutouts, the indexing flange being located on the rail body and configured to box and maintain a module frame position along a short-side direction of the module frame; and one or more cinch clips coupled to the solar panel rail proximate the one or more cutouts, the one or more cutouts dimensioned to fit and anchor the one or more cinch clips.

2. The solar panel rail of claim 1, further comprising a tab located on the rail body and configured to hold the module frame in place, wherein both the indexing flange and tab are configured to provide a predetermined locked in installation position of the module frame during installation thereof.

3. The solar panel rail of claim 1, wherein the one or more cinch clips are configured to couple the rail body to the module frame.

4. The solar panel rail of claim 3, wherein each cinch clip comprises a locking tab configured to secure the module frame in place using a module frame mounting hole.

5. The solar panel rail of claim 1, wherein the indexing flange is further configured to couple the rail body to the module frame via a frame mounting hole.

6. The solar panel rail of claim 1, wherein the short-side direction is a north-south direction for a tracker assembly and an east-west direction for a fixed tilt assembly.

7. The solar panel rail of claim 1, wherein the rail body is configured to be mounted to a torque tube via a rail bracket.

8. The solar panel rail of claim 7, wherein the indexing flange is further configured to box in the module frame along a direction of the torque tube, and wherein the panel rail further comprises a tab located on the rail body and configured to hold the module frame in a direction perpendicular to the direction of the torque tube.

9. The solar panel rail of claim 7, wherein the rail body is further configured to be coupled to the torque tube via a bearing assembly, wherein the bearing assembly is configured to support the torque tube and further configured for rotation of the rail body with respect to the torque tube.

10. A solar panel rail for mounting a photovoltaic module frame thereto, the solar panel rail comprising:

a rail body;

an indexing flange comprising a protrusion extending outwardly from the rail body and one or more cutouts, the indexing flange being located on the rail body and configured to box and maintain a module frame position along a short-side direction of the module frame; and a bifurcated tab located on the rail body and configured to hold the module frame in place.

11. The solar panel rail of claim 10, wherein both the indexing flange and bifurcated tab are configured to provide a predetermined locked in installation position of the module frame during installation thereof.

12. The solar panel rail of claim 11, further comprising:

one or more cinch clips coupled to the solar panel rail proximate the one or more cutouts, the one or more cutouts dimensioned to fit and anchor the one or more cinch clips.

13. The solar panel rail of claim 12, wherein the one or more cinch clips are configured to couple the rail body to the module frame.

14. The solar panel rail of claim 12, wherein each cinch clip comprises a locking tab configured to secure the module frame in place using a module frame mounting hole.

15. The solar panel rail of claim 11, wherein the indexing flange is further configured to couple the rail body to the module frame via a frame mounting hole.

16. The solar panel rail of claim 10, wherein the bifurcated tab is further configured to hold the module frame in place along a long-side direction of the module frame.

17. The solar panel rail of claim 10, wherein the short-side direction is a north-south direction for a tracker assembly and an east-west direction for a fixed tilt assembly.

* * * * *